M. C. HORINE.
PLANETARY DRIVING GEAR.
APPLICATION FILED MAY 5, 1919.
1,392,567.
Patented Oct. 4, 1921.
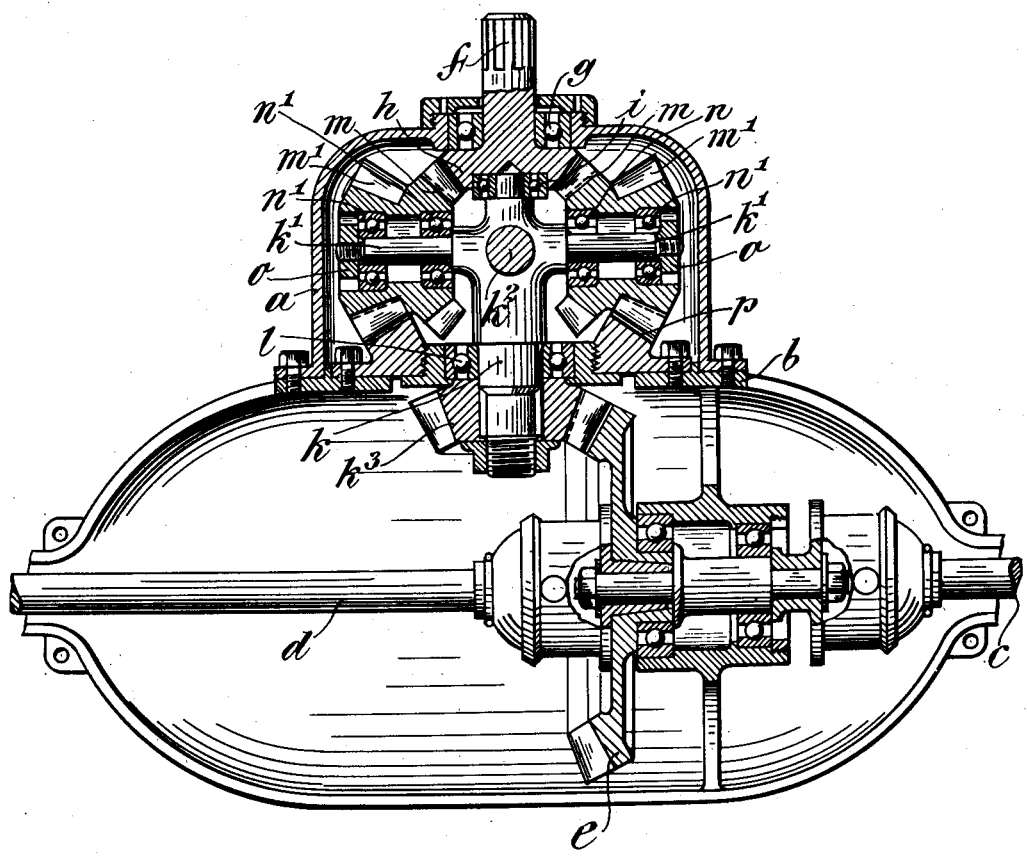

UNITED STATES PATENT OFFICE.

MERRILL C. HORINE, OF NEW YORK, N. Y., ASSIGNOR TO INTERNATIONAL MOTOR COMPANY, OF NEW YORK, N. Y., A CORPORATION OF DELAWARE.

PLANETARY DRIVING-GEAR.

1,392,567.   Specification of Letters Patent.   Patented Oct. 4, 1921.

Application filed May 5, 1919. Serial No. 294,903.

*To all whom it may concern:*

Be it known that I, MERRILL C. HORINE, a citizen of the United States, residing in the borough of Manhattan of the city of New York, in the State of New York, have invented certain new and useful Improvements in Planetary Driving-Gears, of which the following is a specification, reference being had to the accompanying drawing, forming a part hereof.

This invention relates to an improved planetary driving gear especially suitable for use in motor vehicles where a great reduction is desired between the motor and the axle, as in the case of heavy trucks. The invention has for its object to provide planetary gearing in which a maximum reduction will be obtained in a structure which is relatively compact and is characterized by fewness of parts. This elimination of parts is of great importance where, as in the present instance, one of the usual rotating sun gears and associated shaft are eliminated. The invention will be described in detail hereinafter in connection with the illustrated embodiment showing its application to a motor vehicle.

The single figure shows in horizontal section the improved planetary driving gear and so much of the associated driving mechanism of the motor vehicle as is necessary for an understanding of the application of the gear thereto.

While it will be understood as the description proceeds that the driving gear is not to be limited in its use to a motor vehicle since its advantages will make it desirable for use generally for the driving of shafts where a reduction is desired, one type of driven shaft for a motor vehicle has been illustrated. Other types of motor vehicle live axles may be employed without departing from the spirit of the invention. In the drawing the casing $a$ for the improved planetary gear is shown as bolted to a split casing $b$ into which extend axle sections $c$, $d$, arranged to receive power through the master bevel gear $e$ which may be considered throughout the specification and claims as the driven member. Power is derived from what may be termed the propeller shaft $f$ from any available source. This shaft may be journaled in an opening formed in the end wall of the casing on ball bearings $g$ and carry at its inner end a bevel pinion $h$. In the face of the bevel pinion $h$ may be supported a ball bearing $i$ in which is journaled one end of the shaft $k$ of the driven spider, the other end of the shaft being conveniently journaled on ball bearings $l$ supported in a manner to be later described. On the shaft $k$ of the spider are formed the usual oppositely extending arms $k'$, $k^2$, disposed, respectively, at right angles to one another. On each of these radially extending arms is supported a compound planetary pinion $m$, $m'$. The hub of this double pinion may be journaled by two spaced ball bearings $n$, $n'$ on each of such arms $k'$, $k^2$ and locked thereon by a nut $o$ at the end of the shaft. The inner pinion $m$ of each compound pinion meshes with the driving pinion $h$. The outer pinion $m'$ of each planetary pinion meshes with a sun gear $p$ which is bolted to the casing $b$ of the driven member $e$. It is in this sun gear $p$ that the bearing $l$ for the spider shaft $k$ may be threaded or otherwise secured. On the end of the spider shaft $k$ in mesh with the driven gear $e$ is a bevel pinion $k^3$.

The action of the improved planetary driving gear is as follows: Power being applied through the propeller shaft $f$ is transmitted through the pinion $h$ to each of the compound planetary pinions through the inner pinion $m$ thereof and each of these pinions with the spider arms $k'$, $k^2$ is given a planetary motion about the shaft $k$ by reason of the engagement of the outer pinion $m'$ of each planetary pinion with the nonrotatable sun gear $p$. By reason of the improved construction shown the actual driving force for the driven member $e$ is derived from the spider shaft $k$ itself since the arms $k'$, $k^2$ thereof, on which the planetary pinions are carried, are integral with said shaft and the shaft $k$ has fixed thereon the driving pinion $k^3$ which is in mseh with the driven gear $e$. It is believed to be new to take the driving power directly off of the shaft of the spider. By thus using the spider shaft as one of the power transmission elements the sun gear $p$ may be made nonrotatable and the usual rotatable sun wheel and its associated shaft are eliminated. The reduction secured is effected with a minimum number of parts and the utmost compactness, strength and accessibility. The reduction secured in the illustrated embodiment is four to one.

I claim as my invention:

1. Planetary gearing comprising in combination a power shaft, a rotatable spider including a shaft section and radial arms thereon, planetary compound pinions on the arms, a pinion on the power shaft in mesh with one of the pinions of each compound pinion, a nonrotatable sun gear with which the other pinion of each compound pinion meshes, a bearing for the spider shaft carried in the face of the pinion on the power shaft and a second bearing for the spider shaft supported with the sun gear.

2. In a motor vehicle, in combination with the live axle sections therefor, a driven gear for the axle sections, a nonrotatable fixed housing therefor, a propeller shaft, a pinion thereon, planetary reduction gearing comprising a rotatable spider including a shaft section and radial arms thereon, planetary compound pinions on the arms, a pinion on the propeller shaft in mesh with one of the pinions of each compound pinion, a nonrotatable fixed sun gear bolted to the driven gear housing with which the other pinion of each compound pinion meshes, a pinion on the spider shaft located within said housing and in mesh with the driven gear for the axle sections, and a housing for the planetary gearing bolted to the first named housing.

3. In combination, a driven gear, a housing therefor, a nonrotatable sun gear carried by the housing, a power shaft, planetary gearing operatively engaged with the power shaft and the sun gear, a rotatable spider on which said planetary gearing is carried, a ring secured to the sun gear and a bearing for the shaft of said spider mounted in the ring.

4. In combination, a driven gear, a housing therefor, a nonrotatable sun gear carried by the housing, a power shaft, a pinion on the power shaft, planetary gearing operatively engaged with said pinion and the sun gear, a rotatable spider on which said planetary gearing is carried, a ring secured to the sun gear, a bearing for the shaft of said spider mounted in the ring, and a second bearing for the spider shaft carried in the pinion on the power shaft.

This specification signed this first day of May, A. D. 1919.

MERRILL C. HORINE.